US012088491B2

(12) United States Patent
Walters et al.

(10) Patent No.: US 12,088,491 B2
(45) Date of Patent: *Sep. 10, 2024

(54) TECHNIQUES FOR PAYMENT-BASED NETWORK TRANSMISSIONS

(71) Applicant: Capital One Services, LLC, McLean, VA (US)

(72) Inventors: Austin Grant Walters, Savoy, IL (US); Jeremy Edward Goodsitt, Champaign, IL (US); Fardin Abdi Taghi Abad, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 147 days.

This patent is subject to a terminal disclaimer.

(21) Appl. No.: 17/859,324

(22) Filed: Jul. 7, 2022

(65) Prior Publication Data

US 2023/0026509 A1 Jan. 26, 2023

Related U.S. Application Data

(63) Continuation of application No. 16/934,346, filed on Jul. 21, 2020, now Pat. No. 11,418,425, which is a continuation of application No. 16/730,548, filed on Dec. 30, 2019, now Pat. No. 10,757,007.

(51) Int. Cl.
*H04L 45/02* (2022.01)
*G06Q 10/08* (2024.01)
*H04L 9/40* (2022.01)
*H04L 67/63* (2022.01)

(52) U.S. Cl.
CPC ............. *H04L 45/02* (2013.01); *G06Q 10/08* (2013.01); *H04L 63/0421* (2013.01); *H04L 63/0428* (2013.01); *H04L 67/63* (2022.05); *H04L 2209/56* (2013.01)

(58) Field of Classification Search
None
See application file for complete search history.

(56) References Cited

U.S. PATENT DOCUMENTS 10,757,007 B1 * 8/2020 Walters .................. H04W 4/24
11,418,425 B2 * 8/2022 Walters ............... H04L 63/0478
11,514,478 B1 * 11/2022 Paran ................. G06Q 30/0275
(Continued)

*Primary Examiner* — Xavier S Wong
(74) *Attorney, Agent, or Firm* — KDW Firm PLLC

(57) ABSTRACT

Techniques and apparatus for providing payment-based transmission processes are described. In one embodiment, for example, a network node may include a storage device, and logic, at least a portion of the logic implemented in circuitry coupled to the storage device. The logic may operate to provide a routing query to transmit information over a network, the routing query comprising at least one destination node for the information and a transmission value, receive at least one bid from at least one bidding node in response to the routing query, determine a path through the network to transmit the information anonymously based on the at least one bid that corresponds to the transmission value, and transmit the information at least partially anonymously via the path within a network packet encrypted in a number of layers of encryption corresponding to a number of intermediary nodes in the path. Other embodiments are described.

20 Claims, 10 Drawing Sheets

(56) References Cited

U.S. PATENT DOCUMENTS

2007/0088603 A1* 4/2007 Jouppi .............. G06Q 30/0269
                                              705/14.66
2018/0089610 A1* 3/2018 Greco ..................... H04W 4/80
2019/0158594 A1* 5/2019 Shadmon ................ H04L 67/01

* cited by examiner

TECHNIQUES FOR PAYMENT-BASED NETWORK TRANSMISSIONS

RELATED APPLICATIONS

This application is a continuation of U.S. patent application Ser. No. 16/934,346 filed on Jul. 21, 2020, which is a continuation of U.S. patent application Ser. No. 16/730,548 filed on Dec. 30, 2019 (issued as U.S. Pat. No. 10,757,007 on Aug. 25, 2020). The contents of the aforementioned patent and patent application are incorporated herein by reference in their entireties.

TECHNICAL FIELD

Embodiments herein generally relate to network communications and, more particularly, to processes for implementing payment-based network transmissions.

BACKGROUND

Increasing attention to network monitoring capabilities used by various organizations has caused users to seek improved online privacy on data networks, such as the Internet. Due to concern for their private information, certain users have turned to anonymous networks that operate to conceal user information, such as sender information, destination information, network addresses, device information, location information, and/or the like. Conventional anonymous platforms have operated to secure data packets in layers of encryption based on various factors, such as the number of hops that the packet takes over a communication path. Although existing systems have been able to increase the anonymity of users, they lack systems capable of maintaining certain network functions, particularly in a private manner. For example, current anonymous networks are not capable of providing network processing or routing payment functions while ensuring payments and payment information remain secure from public access.

DETAILED DESCRIPTION

Figure 1:
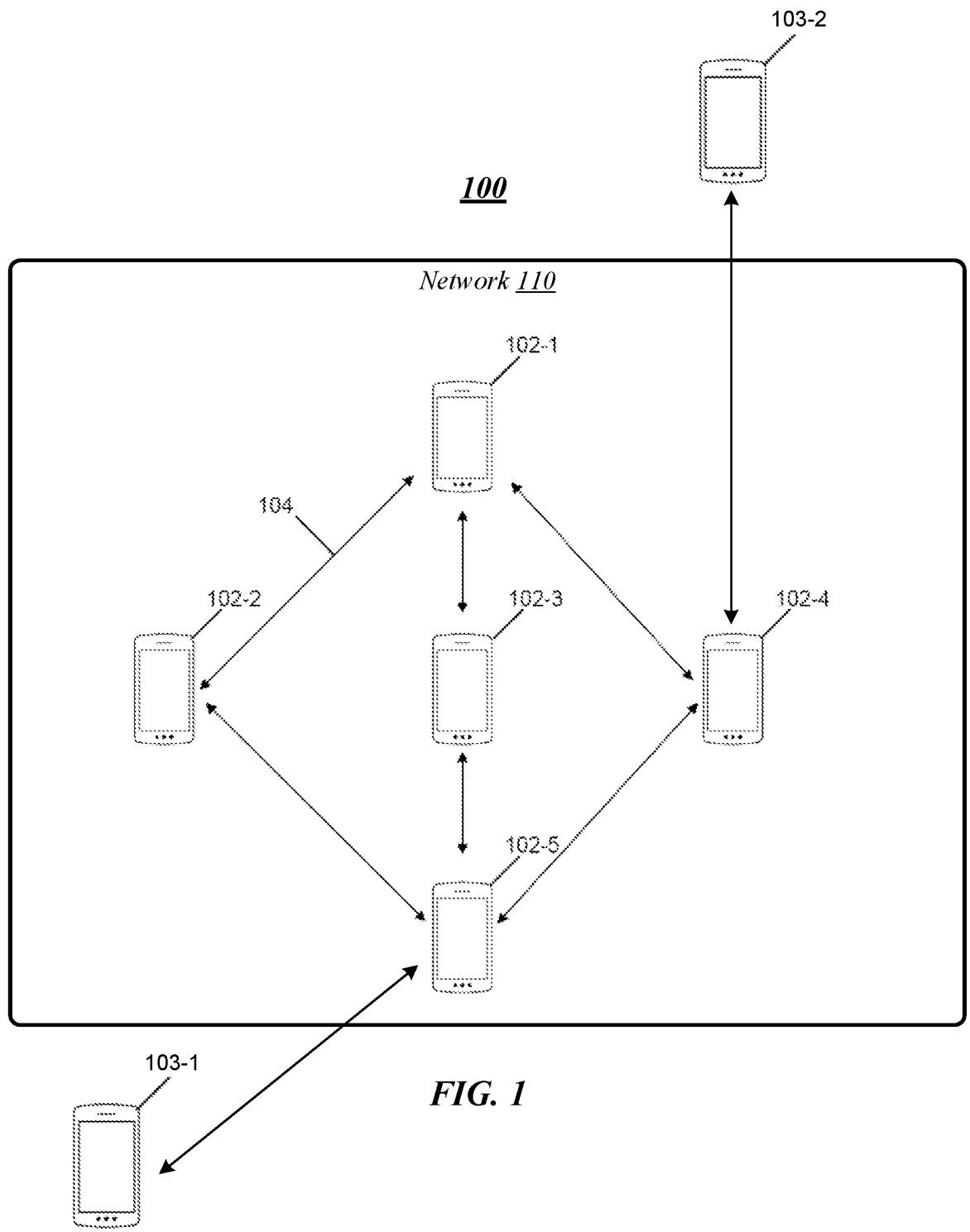
FIG. 1 illustrates an embodiment of a first operating environment.

Various embodiments may generally be directed toward systems, methods, and/or apparatus for implementing a payment-based transmission network (or "network"). In some embodiments, the payment-based transmission network may implement anonymous communications and/or data transmission payments. In various embodiments, the payment-based transmission network may include a plurality of computing nodes (or "nodes") at least a portion of which operate to perform various aspects of a transmission payment process. In some embodiments, a transmission payment process may operate to facilitate the anonymous payment by originating nodes for transmitting data over the payment-based transmission network to a destination node.

For example, an originating node may have or be associated with data (for instance, information, files, packets, network traffic, or the like) that needs to be routed over the network to a destination node. The originating node may broadcast or otherwise communicate a price or value that the sender is willing to expend to transmit the data to reach the destination node. Bidding or intermediary nodes on the network may receive the request and respond with a bid that the bidding node requires to transmit the data along their segment of the path from the originating node to the destination node. The originating node may select among one or more paths that meet the requested price for transmission of the data to the destination nodes.

In some embodiments, the network may be or may include an encrypted network in which transmitted data is encrypted. In various embodiments, the network may operate as an anonymous encrypted network implementing layered encryption the same or similar to "onion routing" (see, for example, Reed et al. titled, "Anonymous connections and onion routing," IEEE Journal on Selected Areas in Communications, 1998, 16(4), pp. 482-494), for instance, implemented according to the Tor network. In onion routing, a packet or other information element may be encrypted in a number of encryption layers for each node or hop along the path from the originating node to the destination node. One layer is decrypted at each node or hop to reveal the information elements next node on its path to the destination node. Accordingly, onion routing communications may be anonymous because each intermediate node only knows the information relating to the immediately preceding and following nodes.

In various embodiments, the data may be encrypted by the originating node using onion routing. For example, if the selected path includes three bidding or intermediary nodes, the originating node may encrypt the data and the payment in three layers of encryption (or four, one for each intermediary node and one for the destination node). The encrypted packet may be transmitted by the originating node to the first intermediary node. The first intermediary node may decrypt the first layer of decryption, take its share of the payment, and route the encrypted packet (now with two layers of encryption) to the second intermediary node, and so on until the packet reaches the destination node. In general, all nodes submitting bids may be labeled as bidding nodes; bidding nodes that are in the accepted path may be labeled as intermediary nodes as they will be performing as intermediaries between the originating node and the destination node.

Payment-based transmission processes, according to some embodiments, may provide multiple technological advantages, including improvements to computing technology, over conventional systems and methods. One non-limiting example of a technological advantage may include incentivizing network users to become nodes of a network by providing payments to network nodes. More nodes in a network may provide for more encryption and, therefore, increased security and anonymity. Another non-limiting example of a technological advantage may include providing a process to allow users to pay for increased encryption. A further non-limiting example of a technological advantage may include providing processes for secure, anonymous data transmission payments. In addition, embodiments may provide technological advantages over conventional networks, including anonymous networks such as Tor. For example, Tor and similar networks have several major disadvantages, including attacks due to the limited number of nodes. Processing according to some embodiments may allow for traffic to be anonymous at varying levels, ensures payment, optimize the number of possible nodes and can make both anonymous payments and web traffic fixing the end-to-end correlation problem of existing onion routing networks, for example, because every network device may be a node.

In this description, numerous specific details, such as component and system configurations, may be set forth in order to provide a more thorough understanding of the described embodiments. It will be appreciated, however, by one skilled in the art, that the described embodiments may be practiced without such specific details. Additionally, some well-known structures, elements, and other features have not been shown in detail, to avoid unnecessarily obscuring the described embodiments.

In the following description, references to "one embodiment," "an embodiment," "example embodiment," "various embodiments," etc., indicate that the embodiment(s) of the technology so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

FIG. 1 illustrates an example of an operating environment 100 that may be representative of some embodiments. The operating environment 100 can be a network 110 and can include a first node 102-1, a second node 102-2, a third node 102-3, a fourth node 102-4, and a fifth node 104-5 node. Mesh network 110 is not limited to the number of nodes depicted in FIG. 1.

Network 110 may be or may include various types of networks, such as peer-to-peer networks, mesh networks, and/or the like. In various embodiments, network 110 may be a mesh network that can operate according to any known mesh networking protocol or standard. Although a mesh network is used in this Detailed Description, embodiments are not so limited, as any type of network capable of operating according to some embodiments is contemplated herein.

In various embodiments, data, traffic, messages, or other communications within mesh network 110 can be transmitted between nodes 102 as described herein. In various embodiments, data, traffic, messages, or other communications within mesh network 110 can be transmitted from an initial node to a desired recipient node through a path formed from one or more intermediate nodes. Mesh network 110 may provide a payment system according to some embodiments within mesh network 110 that does not require each node 102 to be connected directly to the Internet. In various embodiments, one or more nodes 102 can maintain a blockchain for a cryptocurrency that can support a payment system useable within mesh network 110 and that can support secure communications within mesh network 110.

As an example, node 102-1 and node 102-5 can each be considered to be an authorized or trusted node on mesh network 110. In some embodiments, each of nodes 102 are considered to be "authorized," such that there are not separate "authorized" and "unauthorized" populations of nodes. In various embodiments, each of nodes 102 may be "peer" nodes with the same or essentially the same rights, functionality, access, and/or the like on mesh network. In such a peer embodiment, each node may be capable of performing the functions described in reference to authorized nodes. In some embodiments, an "authorized" node may include any node 102 of network 110 that has agreed to operate as a node. Embodiments are not limited in this context.

One or more of the authorized nodes 102-1 and 102-5 can maintain a blockchain (see, for example, FIGS. 6 and 7) for cryptocurrency used within mesh network 110. One or more of authorized nodes 102-1 and 102-5 can process transactions related to the blockchain including, for example, updating the blockchain based on a transaction and distribute the updated blockchain. Transactions can be conducted within mesh network 110 and can utilize the cryptocurrency blockchain maintained by one or more of nodes 102-1 and 102-5. In some embodiments, transactions may be or may include payment-based data transmissions. Communications or other messages can be transmitted within mesh network 110 using encryption features provided by the cryptocurrency and/or blockchain such that the communications or other messages can be provided in a secure manner.

In an example, nodes 102-2, 102-3, and 102-4 can each be considered to be an unauthorized or untrusted node. In various embodiments, as unauthorized nodes, nodes 102-2, 102-3, and 102-4 can each route communications or other messages to an authorized node (e.g., nodes 102-1 and 102-5) but cannot directly send messages to one another (e.g., node 102-2 cannot directly send a message to node 102-3). In various embodiments, as unauthorized nodes, nodes 102-2, 102-3, and 102-4 may be allowed to receive and transmit communications, messages, or other traffic on a limited basis. In various embodiments, one or more of the authorized nodes 102-1 and 102-5 can determine the allowed level of participation on mesh network 110 by nodes 102-2, 102-3, and 102-4.

In some embodiments, external nodes 103 may be able to access portions of mesh network 110. For example, node 103-1 may seek to transmit information to node 103-2. The user of node 103-1 may seek to transmit the information anonymously and may be willing to pay a cost for anonymous transmission according to some embodiments. Accordingly, node 103-1 may request to transmit the information using the payment-based transmission process of the mesh network 110, although node 103-1 is not a member of mesh network 110.

Path 104 can represent a communication path between certain nodes on mesh network 110 (e.g., between node 102-1 and node 102-2). Other paths 104 between certain nodes are shown in FIG. 1 but are not labeled for simplicity. The path 104 can indicate that communication between certain nodes is allowed or possible within mesh network 110. In various embodiments, communications between authorized node 102-1 and authorized node 102-5 can be provided through node 102-3; for example, node 102-3 can relay messages between the authorized nodes 102-1 and 102-5. In various embodiments, a communication path is not shown between node 102-3 and node 102-4 since each node is unauthorized and cannot directly send messages to one another. Instead, nodes 102-3 and 102-4 may be allowed to perform only limited functions with respect to the mesh network 110 as described herein. In various other embodiments, each node 102 of mesh network 110 may communicate with every other node 102 of the mesh network 110.

In some embodiments, each of nodes 102 may be connected to every other node of network 110. In other embodiments, at least a portion of nodes 102 may only be connected to a limited number or region of nodes. Accordingly, network 110 may be formed as a network of connected node regions. For example, nodes 102-1, 102-2, and 102-3 may be a first node region and nodes 102-4 and 102-5 may be a second node region and only nodes 102-2 and 102-5 are communicably coupled to each other. Accordingly, in order for a data packet sent by node 102-4 to reach node 102-1, the packet would have to travel along the path of node 102-4, node 102-5, node 102-2, and then node 102-1. In some embodiments, a region of nodes may be or may include about 8-10 nodes. Embodiments are not limited in this context.

In various embodiments, each of nodes 102 can be associated with a wallet that may be associated with a value, such as units, a currency, tokens, and/or the like. For example, the wallet may be or may include a cryptocurrency wallet that can be loaded with an amount of cryptocurrency (e.g., cryptocurrency tokens). In some embodiments, for example, authorized nodes 102-1 and 102-5 can issue the cryptocurrency wallets for the other nodes 102-2, 102-3, and 102-4. The authorized nodes 102-1 and 102-5 can also control access to the mesh network 110. As an example, the authorized nodes 102-1 and 102-5 can grant or deny a request by another node 102 (e.g., node 102-2) to join and participate on mesh network 110. In various embodiments, only authorized nodes can be associated with a cryptocurrency wallet.

The authorized nodes 102-1 and 102-5 can be designated as such in a number of manners. In various embodiments, a node 102 can be considered an authorized node 102 once it holds or stores a certain amount or value of cryptocurrency. In various embodiment, a node 102 can be considered an authorized node 102 once a certain number of other nodes 102 (e.g., authorized nodes) determine node 102 should be an authorized node. In various embodiments, a node 102 can be considered an authorized node 102 once it helps facilitate a certain number of transactions using the blockchain (e.g., helps authorize transactions based on the blockchain). In general, to become an authorized node, one or more criteria may be met as described herein. Once a node becomes an authorized node, the node can communicate in any manner with any other node of the mesh network 110, can manage the participation of other nodes on the mesh network including, for example, issuing cryptocurrency wallets, and can manage a blockchain of the cryptocurrency. An authorized node can receive payments (e.g., based on the cryptocurrency) for processing transactions and maintaining the blockchain and can receive payments for routing communications and other messages through mesh network 110.

In contrast, unauthorized nodes are generally limited to routing communications and other messages to authorized nodes. In various embodiments, unauthorized nodes can receive payments (e.g., based on the cryptocurrency) for helping to facilitate transactions within mesh network 110, for example, by routing traffic carrying data related to a transaction toward an authorized node and by helping to authorize a transaction (e.g., when a desired cryptocurrency transaction requires authorization from multiple nodes for verification). In various embodiments, unauthorized nodes can also receive payments for routing communications and other messages through mesh network 110 (e.g., subject to any routing limitations related to operating as an authorized node). In various embodiments, one or more of the authorized nodes 102-1 and 102-5 can be connected to the Internet and/or a remote network. In various embodiments, the one or more of the authorized nodes 102-1 and 102-5 can ensure that a maintained blockchain is up to date and accurate with versions of the blockchain maintained outside of mesh network 110.

For purposes of illustration and explanation only, five nodes 102 are shown in FIG. 1, but the number of nodes 102 capable of operating on mesh network 110 is not so limited as any number of nodes 102 can be included within mesh network 110. Nodes 102 can represent any type of electronic and/or computing device maintained by an operator or user including, for example, a smartphone, a tablet, a laptop, or any other consumer electronic device capable of operating as a node 102 on mesh network 110. The operator or user of any of nodes 102 can be a private individual or can be a business owner or purveyor such that certain nodes 102 can represent a point of sale node (e.g., a node associated with the sale of a good or service). Accordingly, transactions can be conducted entirely within mesh network 110 using the blockchain between a POS node and an individual node and/or between two individual nodes.

For purposes of discussion, operation of node 102-2 is described in relation to joining mesh network 110 and can be applicable to any other node 102 on mesh network 110. In various embodiments, node 102-2 can receive data or other information relating to mesh network 110. In various embodiments, an application ("app" or "mobile app") or other program can be downloaded onto node 102-2. The data or other information relating to mesh network 110 and/or the downloaded app can be used to establish the electronic device and/or computing device as node 102-2 on mesh network 110. Other nodes 102 can also be established on mesh network 110 in a similar manner. After the computing device is established as node 102-2 that is capable of operating on mesh network 110, node 102-2 can generate a cryptocurrency wallet. The generated cryptocurrency wallet can be stored on node 102-2, for example, within a storage device and/or memory unit of the computing device established as node 102-2. The cryptocurrency wallet for node 102-2 can be issued by an authorized node of the mesh network such as, for example, node 102-2 or node 102-5.

After generating a cryptocurrency wallet, the user of the computing device operating as node 102-2 can load the generated cryptocurrency wallet with an amount of cryptocurrency tokens. The amount of cryptocurrency tokens can be issued by an authorized node of the mesh network. As an example, node 102-2 can provide a payment to the authorized node 102-1 in exchange for a corresponding amount of a cryptocurrency (e.g., cryptocurrency tokens). Other nodes 102 of mesh network 110 can generate a cryptocurrency wallet and load the wallet with cryptocurrency in a similar manner. In various embodiments, only authorized nodes are allowed to conduct financial transactions on mesh network 110. In various embodiments, unauthorized nodes are allowed to also conduct financial transactions on mesh network 110.

As an example, the authorized node 102-1 can conduct transactions within mesh network 110 using cryptocurrency stored in a generated wallet. As an example, node 102-1 can initiate and conduct a transaction with node 102-5 (e.g., for a good or service offered by node 102-5). Payment can be provided by node 102-1 to node 102-5 based on cryptocurrency stored in the generated wallet of node 102-1. One or more authorized nodes, such as node 102-1, can update and manage the blockchain to reflect the transaction between node 102-1 and node 102-5. Transactional data or information can be transferred between nodes 102-1 and 102-5 to facilitate the transaction. One or more unauthorized nodes, such as node 102-2, can transfer messages related to the transaction between nodes 102-1 and 102-5. In doing so, node 102-2 can receive a payment (e.g., from node 102-1 and/or node 102-5) for facilitating the transaction.

In various embodiments, messages relating to transactions can be routed to the authorized nodes 102-1 and node 102-5 to facilitate the management of the blockchain. Nodes 102-1 and 102-5 can manage the cryptocurrency blockchain and can, therefore, know the current state of the blockchain. The blockchain managed by nodes 102-1 and 102-5 can be distributed within mesh network 110 including, for example, a state of the blockchain. Nodes 102-1 and 102-5 may also provide access to remote networks and/or the Internet to facilitate communications between any of nodes 102 and remote device operating outside of mesh network 110. In various embodiments, as shown in FIG. 1, the unauthorized nodes 102-2, 102-3, and 102-4 can funnel or route all traffic, for example, any type of communication or transactional information, to the authorized nodes 102-1 and 102-5.

In various embodiments, mesh network 110 can operate without being under the control of a central authority. Instead, mesh network 110 can be facilitated by peer nodes and/or several distributed authorized nodes (e.g., nodes 102-1 and 102-5) that manage a payment system (e.g., cryptocurrency blockchain) that can be used to conduct transactions on mesh network 110, with other nodes on mesh network 110 routing transactional related traffic to the authorized nodes to earn payments, and routing secure communications between nodes to also earn payment. Communications can be made secure using private and/or public keys associated with generated cryptocurrency wallets as issued by the authorized nodes as described herein. For example, the public and/or private keys associated with the cryptocurrency wallets can be used to encrypt and decrypt messages sent within the mesh network to maintain the messages in a secure manner as described herein.

Figure 2A:
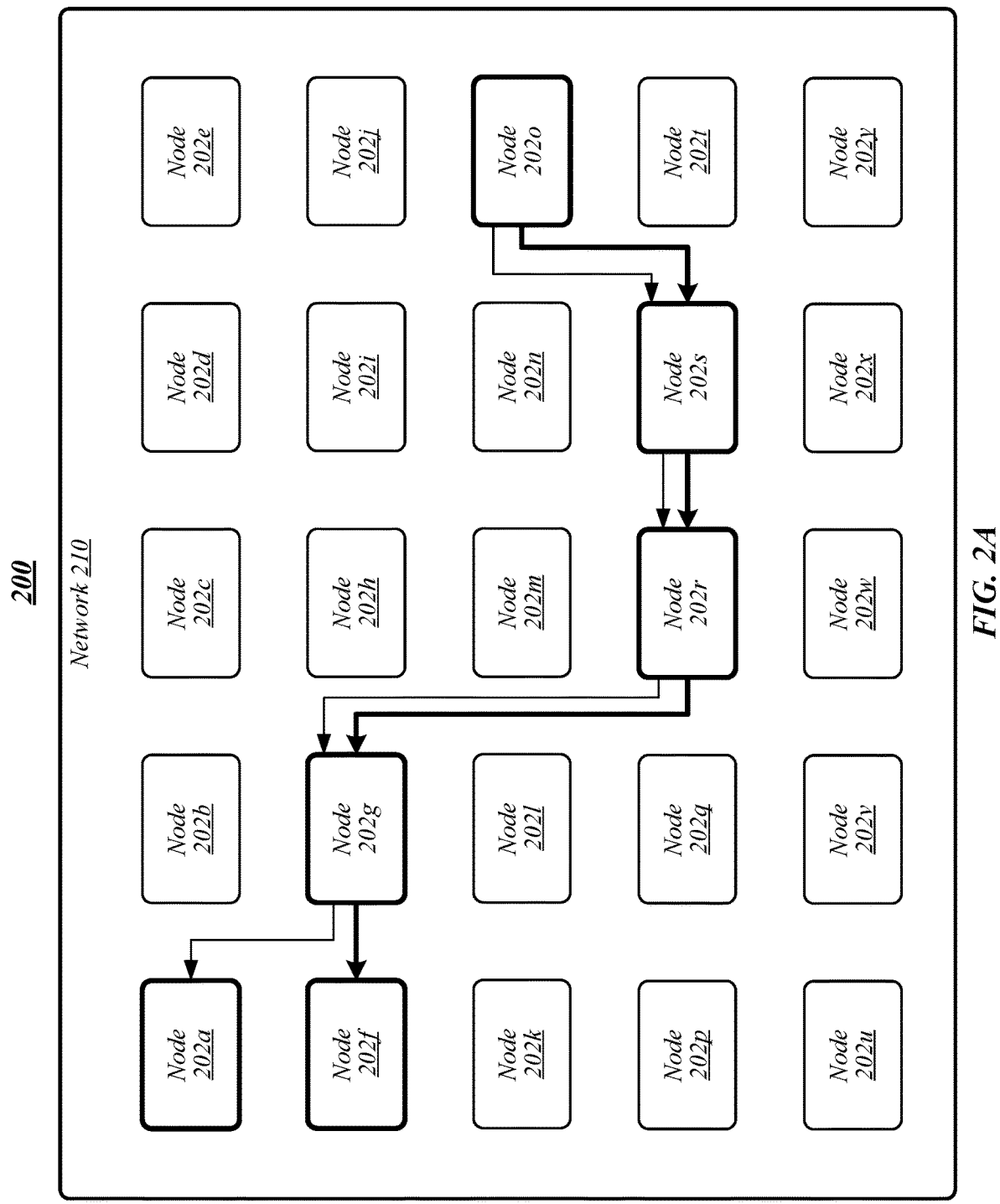
FIG. 2A illustrates an embodiment of a second operating environment.

FIG. 2A illustrates an example of an operating environment 200 that may be representative of some embodiments. As shown in FIG. 2A, network 210 may include a plurality of nodes 202a-y. In various embodiments, nodes 202a-y may be configured to transmit information to various other nodes of network 210. In some embodiments, network 210 may be a network configured the same or similar to network 110.

Node 202s may be an originating node seeking to transmit a packet or other information element to destination node 202f. Node 202s may generate a routing query to transmit the packet over network 210. In exemplary embodiments, the routing query may include information that may be used by other nodes 202a-y to decide on whether to act as an intermediary node. In some embodiments, routing query may include a destination node, a transmission value, and/or timing information (for instance, a time window where at least a portion of the transmission must take place), quality information (for instance, error rates, service level information, and/or the like). In exemplary embodiments, the transmission value may include an offer amount that the network node offers to pay to route the information to the at least one destination. For example, node 202s may offer 2 units, tokens, dollars, or other value to transmit the packet to destination node 202a.

The routing query may be broadcast to all or a portion of nodes 202a-y. In some embodiments, the routing query may only be transmitted to a subset of nodes 202a-y based on various factors, such as availability, originating node preference, and/or the like. Nodes 202a-y receiving the routing query may transmit a bid as bidding nodes for transmitting the packet to the next node in the path. The transmission value and/or the bid values may be set based on various factors, such as the cost to process (for instance, decryption and encryption) the packet and to transmit the packet to the next node, such as power consumption costs, electricity costs, and/or the like. In some embodiments, nodes 202a-y may automatically determine a threshold cost for transmission, which may be used to automatically determine the bid value (plus a percentage markup, for example). Accordingly, an intermediary node may receive payment for the work required for encryption and decryption of a packet.

In some embodiments, a bid may be based on data size, such as an offer to transmit a data size unit per unit (1 byte for $1/1000^{th}$ of a coin), time (for instance, a rate per millisecond to process the packet and/or transmit to the next node). Accordingly, nodes 202a-y and/or groups thereof may compete to be the cheapest node for processing a packet as it passes through network 210. In some embodiments, paths, regions, or other groups of nodes may establish a rate, for example, during a certain time period. For example, nodes 202a-c may set an automatic bid amount of 3 units to traverse this path.

In some embodiments, a bid value of a node 202a-y may be static or semi-static to save on resources (for instance, having to ping a node 202a-y for each transmission query). For example, nodes 202a-y may include a bid table that includes a record for one or more other nodes 202a-y. Each record may include a bid amount for a node 202a-y, a timestamp to indicate the age of that bid amount, and/or an expiration time for the bid amount. In some embodiments, bid amounts may be provided to nodes 202a-y on a push basis whenever a node 202a-y changes their default bid amount. In other embodiments, bid amounts may be accessed on a pull basis, for example, responsive to a transmission query or when a bid amount has expired.

In various embodiments, node 202s may receive one or more bids from one or more of nodes 202a-y and/or groups thereof. Node 202s and nodes 202a-y may continue the bid/request process until a transmission value is met. In general, nodes 202a-y preferring security and anonymity over transmission time may operate to accept bids that have the most nodes in order to increase the layers of encryption to the destination node. For example, node 202s may receive a first bid of 3 units from nodes 202a-y that leads to a path of 2 nodes and a second bid of 3 units that leads to a path of 3 nodes. Node 202s may select the second bid in order to achieve more layers of encryption for transmission of the packet. Accordingly, in some embodiments, the payment-based transmission process may operate for an originating node as a secure process for paying for encryption and, therefore, anonymity. In some embodiments, nodes 202a-y may participate as intermediary nodes to obtain units or other funds. In various embodiments, nodes 202a-y may purchase units using the currency.

Figure 2B:
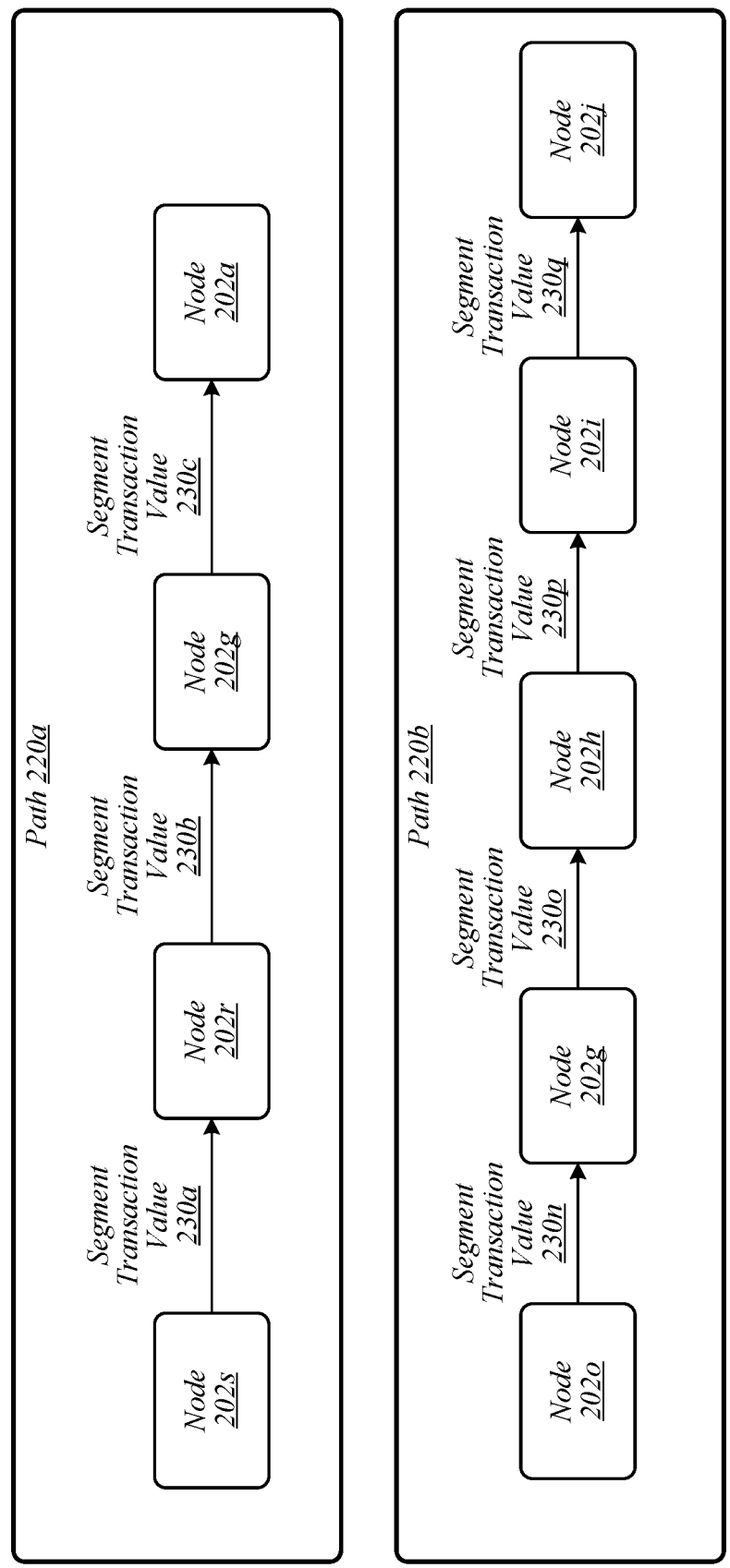
FIG. 2B illustrates embodiments of a transmission path according to some embodiments.

Referring now to FIG. 2B, therein are depicted as illustrative transmission paths according to some embodiments. In the example of FIGS. 2A and 2B, originating node 202s may have accepted a bid by bidding nodes 202r and 202g to transmit a packet from originating node 202s to destination node 202a to form path 220a (bidding nodes 202r and 202g may be termed intermediary nodes once the path of the winning bid is selected). Each segment of path 220*a* may be associated with a segment transaction value 230, which is the cost to send the information along that particular path. In some embodiments, there may only be segment transaction values 230 only for intermediary nodes 202*r* and 202*g*. For example, there may be a segment transaction value 230*a* to pay for intermediary node 202*r* to handle the packet and segment transaction value 230*b* to handle the packet. In some embodiments, destination node 202*a* may also be included in the transaction value, for example, with segment transaction value 230*c*. In the example of path 220*a*, segment transaction value 230*a* may be 0.5 units, segment transaction value 230*b* may be 1 unit, and segment transaction value 230*c* may be 0.5 units.

In some embodiments, node 202*s* may determine the path based on the intermediary nodes of the accepted bid. Node 202*s* may encrypt the packet with a number of layers that corresponds with the number of nodes in the path. For example, for path 220*a*, node 202*s* may encrypt the packet with three layers: a first (outer) layer for node 202*r*, a second layer for node 202*g*, and a third layer for node 202*a*. In various embodiments, node 202*s* may include the payment in the encrypted packet, for example, implemented via a wallet. In some embodiments, the wallet may be or may include a cryptocurrency or crypto-based wallet, such as Bitcoin, Ethereum, or other block-based chain cryptocurrency. In various embodiments, node 202*s* may include the entire amount (for instance, 2 units) in the encrypted packet. In some embodiments, the entire amount may be included in the first encryption layer so that the first intermediary node may access the payment.

In some embodiments, intermediary nodes 202*r* and 202*g* may operate to receive the encrypted packet and decrypt the top layer of the packet to access the corresponding information. Unless the node is the destination node, the information may include the next node and the payment. For example, node 202*r* may decrypt the encrypted packet and take the segment transaction value 230*a* of 0.5 units and access the next node information. Node 202*r* may encrypt the packet for the next intermediary node, node 202*g*, with the remaining payment amount (1.5 units). Destination node 202*a* may decrypt the packet to receive the data payload (as well as any payment amount remaining).

Accordingly, the entire payment for the remaining processing may be passed from node-to-node. For example, in a three-node path, the first node would receive the full payment, the second node would receive (full payment−node 1 payment), and the third node would receive (full payment−(node 1 payment+node 2 payment). In some embodiments, if a node retains more than their allotted share of the payment, they may be penalized. Non-limiting examples of penalties may include taking the over-amount (plus a penalty), being removed from network 210, being designated as an unauthorized or untrusted node, and/or the like.

In another example illustrated in FIGS. 2A and 2B, originating node 202*o* may have broadcast a transmission query for routing a packet to destination node 202*f* with a transmission value greater than the request of node 202*a* (for example, 3 units). Node 202*o* may have received a bid that included path 220*b*, with one additional node compared with path 220*a*. Accordingly, the additional transmission value (1 unit) provided node 202*o* with an additional node (and, therefore, encryption layer). In the example of path 220*b*, segment transaction value 230*n* may be 0.5 units, segment transaction value 230*o* may be 1 unit, segment transaction value 230*p* may be 0.5 units, and segment transaction value 230*q* may be 1 unit.

In some embodiments, an originating node may only have enough units to encrypt for only part of the path to the destination node. Accordingly, a packet may be encrypted for each hop until the originating node runs out of units. In various embodiments, a node failure process may be initiated responsive to a node failure. For example, node 202*g* of path 202*a* may fail or otherwise be unable to transmit a packet. In some embodiments, the node failure process may manage a failed node the same or similar to a lost packet and/or a connection lost. In exemplary embodiments, responsive to a failed node, the node failure process may allocate a new node, allocate a new path, and/or reconnect and start a new path (or new section).

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation. Blocks designated with dotted lines may be optional blocks of a logic flow.

A logic flow may be implemented in software, firmware, hardware, or any combination thereof. In software and firmware embodiments, a logic flow may be implemented by executable computer instructions stored on a non-transitory computer readable medium or machine-readable medium, such as an optical, magnetic or semiconductor storage. The embodiments are not limited in this context.

Figure 3:
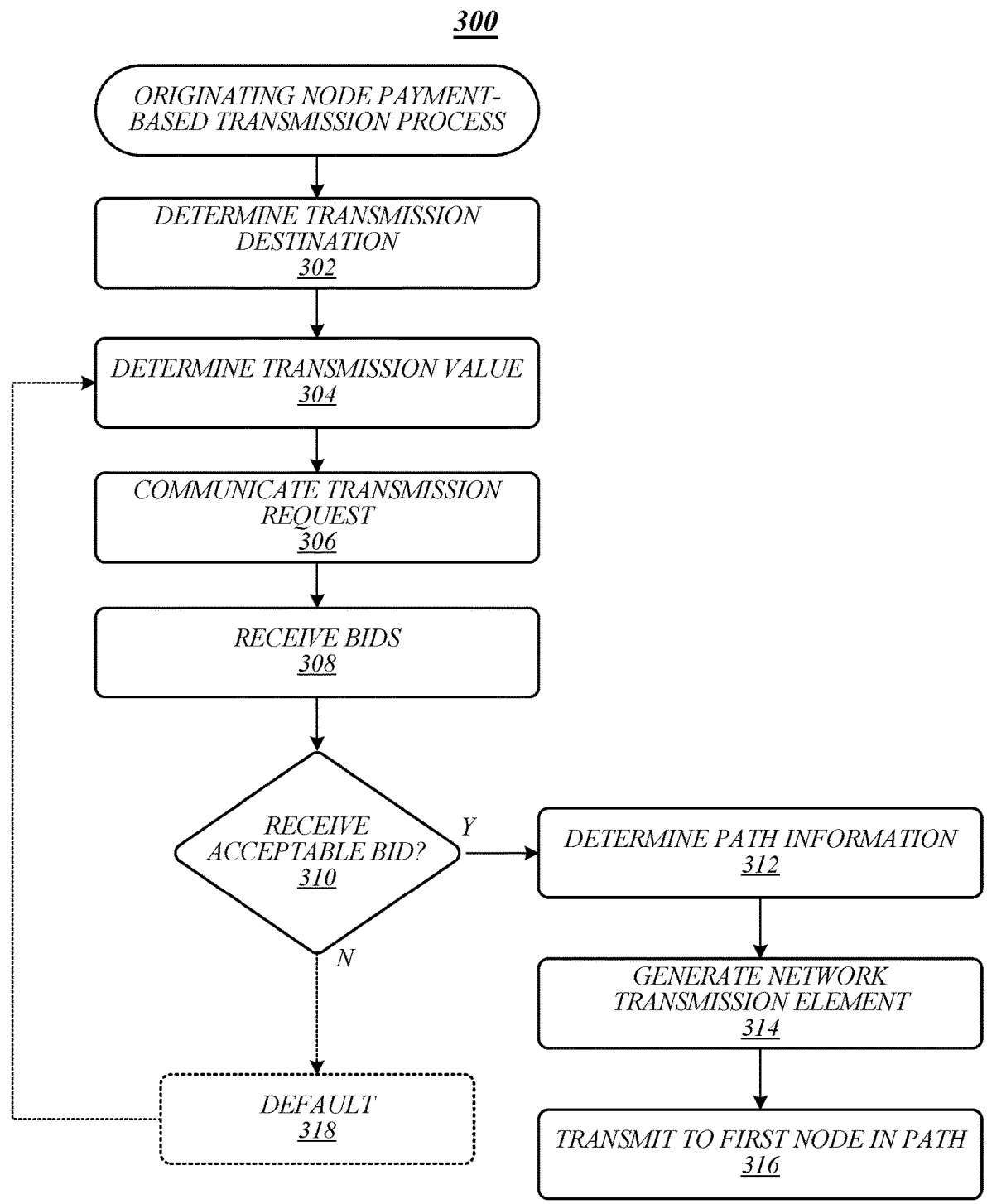
FIG. 3 illustrates an embodiment of a first logic flow.

FIG. 3 illustrates an embodiment of a logic flow 300. Logic flow 300 may be representative of some or all of the operations executed by one or more embodiments described herein, such as nodes 102 of network 110 and/or nodes 202*a-y* of network 210. In some embodiments, logic flow 300 may be representative of some or all of the operations of payment-based transmission process for an originating node according to some embodiments.

At block 302, logic flow 300 may determine a transmission destination. For example, node 202*s* may determine data for transmission in the form of a data packet to be sent to destination node 202*a* via network 210. Logic flow may determine a transmission value at block 304. For example, node 202*s* may determine a cost it is willing to pay to transmit the data packet(s) to node 202*a*. The cost may be based on various factors, such as importance of data, distance of node 202*a*, available funds, and/or the like.

Logic flow 300 may communicate the transmission request at block 306. For example, node 202*s* may broadcast a transmission query to all or a subgroup of nodes 202*a-y* of network 210. In some embodiments, node 202*s* may send the transmission query first to a preferred set of nodes 202*a-y* then, if no bids or no acceptable bids are received, may send or broadcast to other nodes 202*a-y* outside of this group. At block 308, logic flow 300 may receive bids. For example, node 202*s* may receive bids indicating a bid amount a bidding node requires to transmit the information through the at least one bidding node on a path to or toward destination node 202a.

At block 310, logic flow 300 may determine whether any acceptable bids were received. For example, an acceptable bid may include a bid at or below the transmission value that includes the largest number of nodes. In some embodiments, if an acceptable bid is received, logic flow 300 may determine the path information at block 312. For example, node 202s may determine path 220a to node 202a of the selected bid. In various embodiments, node 202s may add up the values of the bids to determine a longest path to destination node 202a to arrive at the selected bid. In some embodiments, other factors, such as transmission speed, transmission quality, and/or the like may also be considered as part of the bid process. For example, nodes 202a-y and/or combinations thereof may be weighted to select a path in the case of ties or other similar bid situations.

Logic flow 300 may generate a network transmission element at block 314. For example, node 202a may generate an encrypted packet with a number of encryption layers that equal the number of nodes in the transmission path. In some embodiments, the encrypted packet may include the payment, such as a cryptocurrency payment implemented via a wallet. At block 316, logic flow 300 may transmit the network transmission element to the first node in the path. For example, node 202s may transmit the encrypted packet to node 202r of path 220a.

If logic flow 300 does not determine an acceptable bid at block 310, logic flow 300 may proceed to a default function. For example, logic flow 300 may return to block 304 to determine a different transmission value and to try the bidding process again. In another example, logic flow 300 may inform the user that transmission via network 210 for the transmission value has not been accepted. In a further example, logic flow 300 may transmit the packet using a default path (which may or may not be encrypted), for example, using up the transmission value to encrypt the packet until the transmission value is used up.

Figure 4:
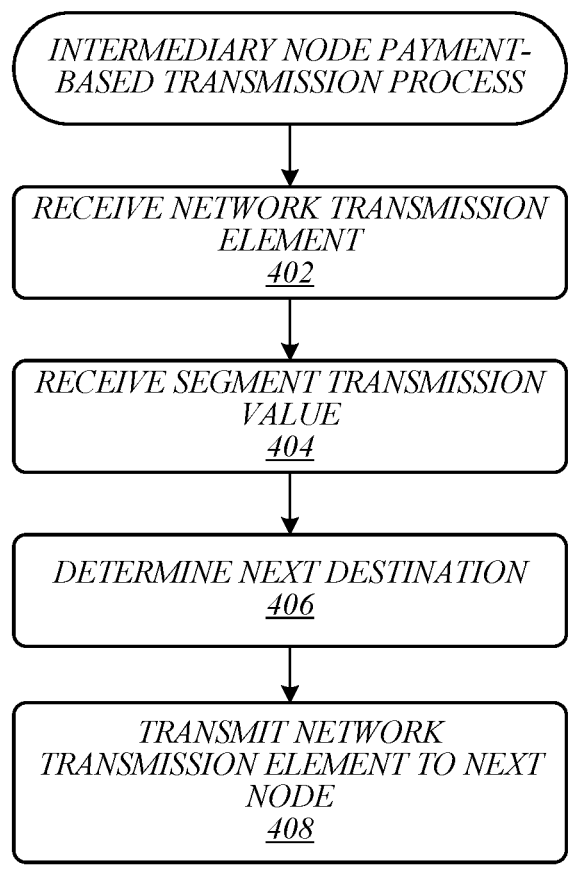
FIG. 4 illustrates an embodiment of a second logic flow.

FIG. 4 illustrates an embodiment of a logic flow 400. Logic flow 400 may be representative of some or all of the operations executed by one or more embodiments described herein, such as nodes 102 of network 110 and/or nodes 202a-y of network 210. In some embodiments, logic flow 400 may be representative of some or all of the operations of payment-based transmission process for an intermediary node according to some embodiments.

At block 402, logic flow 400 may receive a network transmission element. For example, node 202r may receive an encrypted packet from originating node 202s. Logic flow 400 may receive a segment transmission value at block 404. For example, node 202r may decrypt the first encryption layer of the encrypted packet to receive the full payment value for the transmission process. Node 202r may take the amount apportioned to node 202r based on the accepted bid for the transmission process.

At block 406, logic flow 400 may determine the next destination. For example, node 202r may access information decrypted from the first encryption layer to determine the next node in the path (node 202g). Logic flow 400 may transmit the network transmission element to the next node. For example, node 202r may encrypt the packet with the remaining payment amount and transmit the packet to node 202g.

Figure 5:
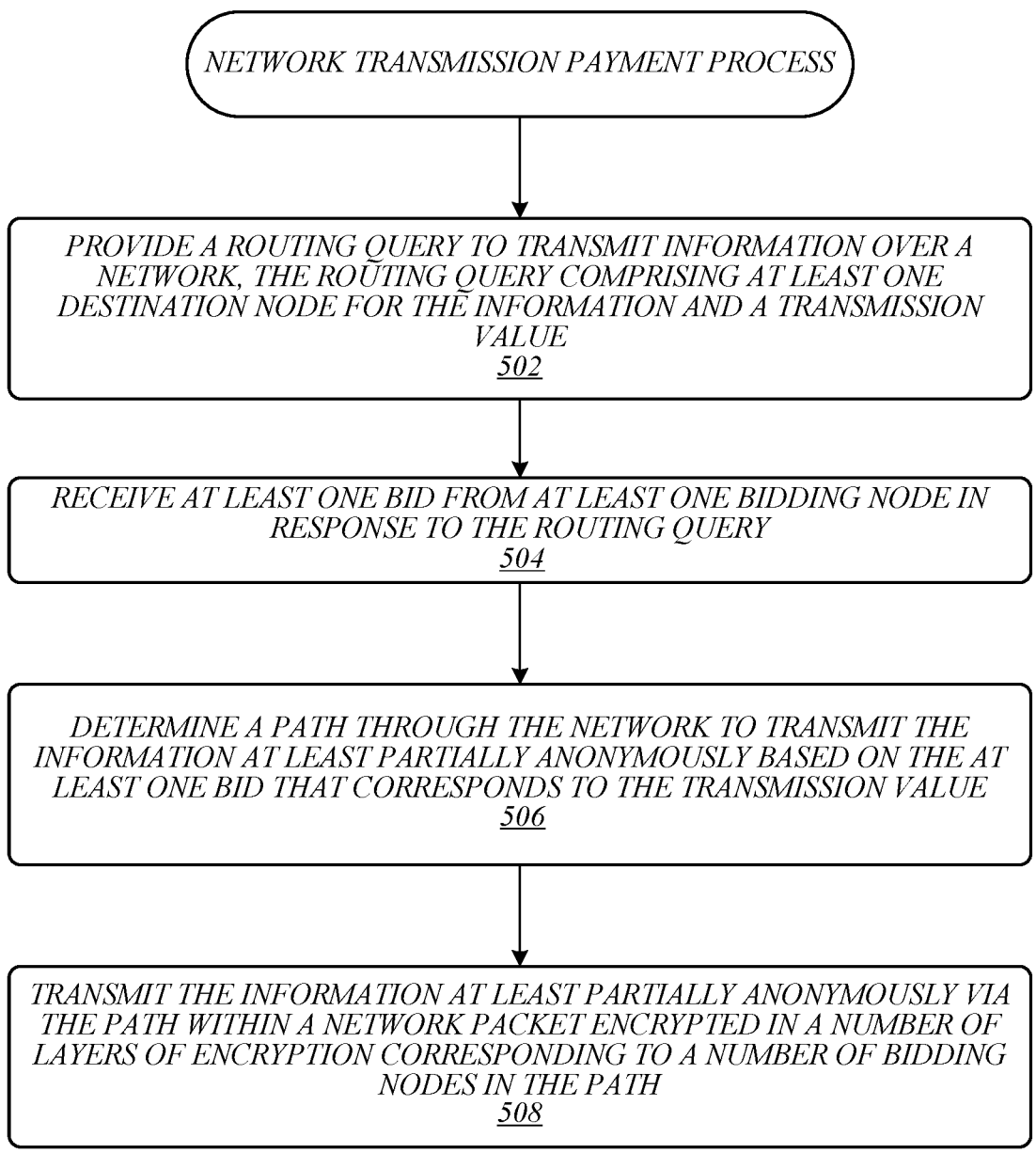
FIG. 5 illustrates an embodiment of a third logic flow.

FIG. 5 illustrates an embodiment of a logic flow 500. Logic flow 500 may be representative of some or all of the operations executed by one or more embodiments described herein, such as nodes 102 of network 110 and/or nodes 202a-y of network 210. In some embodiments, logic flow 400 may be representative of some or all of the operations of a payment-based transmission process according to some embodiments At block 502, logic flow 500 may provide a routing query to transmit information over a network, the routing query comprising at least one destination node for the information and a transmission value. Logic flow 500 may receive at least one bid from at least one bidding node in response to the routing query at block 504. Logic flow 500 may determine a path through the network to transmit the information at least partially anonymously based on the at least one bid that corresponds to the transmission value at block 506. At block 508, logic flow 500 may transmit the information at least partially anonymously via the path within a network packet encrypted in a number of layers of encryption corresponding to a number of bidding nodes in the path.

Figure 6:
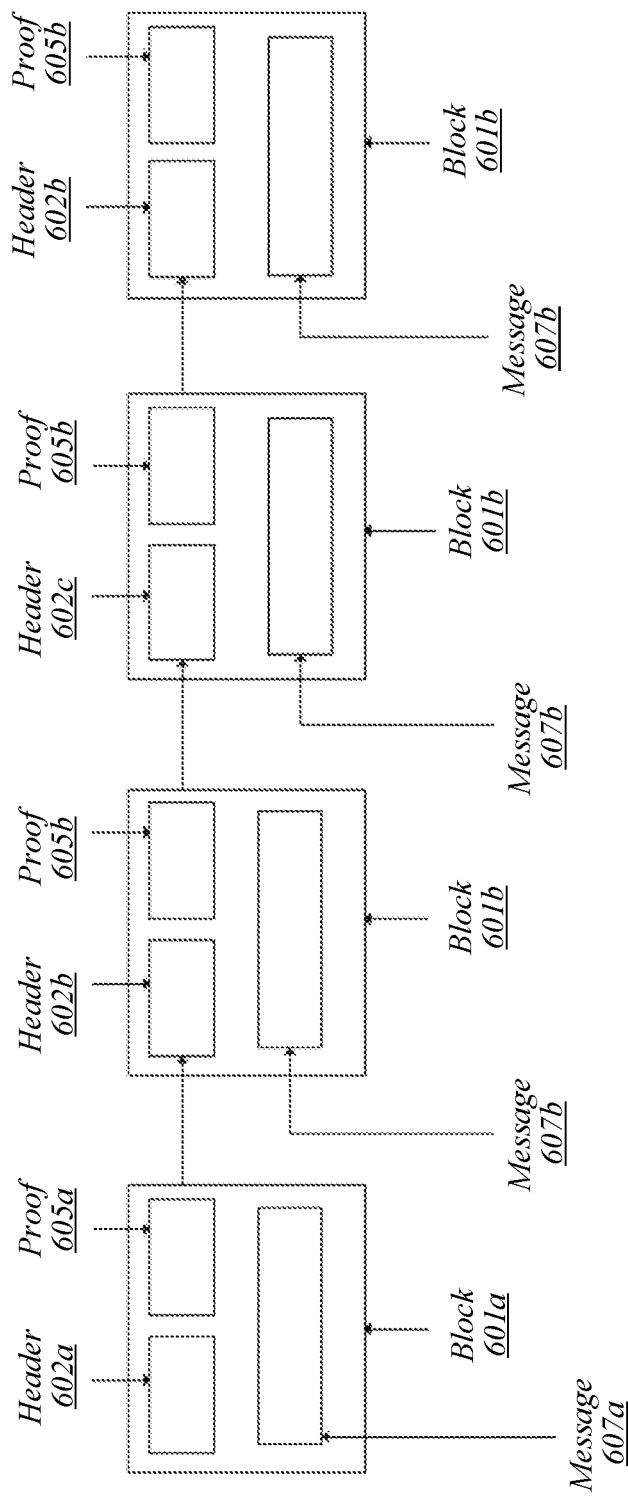
FIG. 6 illustrates a logical model of a blockchain.

FIG. 6 depicts a logical model 600 of an exemplary blockchain, consistent with disclosed embodiments. The blockchain may comprise blocks, such as blocks 601a-601d. Blocks may include messages, such as message 607a-607d. Generally, blocks may include a header, such as headers 602a-602d, which uniquely identifies each block. The headers 602a-602d may include a hash value generated by a hash function. A hash function is any function that can be used to map input data of arbitrary size to a hash value of a fixed size. For example, a header may include at least one of the previous block's hash value, a hash value generated based on any messages in the block (e.g., a Merkle root), and a timestamp. Consistent with disclosed embodiments, blocks added to a blockchain described herein may satisfy at least one of a proof-of-work condition and a digital signature condition. For example, the headers 602a-602d may include a nonce chosen to ensure the header satisfies the proof-of-work condition. As a non-limiting example, the proof-of-work condition may require the hash of the header fall within a predetermined range of values. As an additional example, the header may be digitally signed with a cryptographic key of an authorized system, and the digital signature may be included in the header. This digital signature may be verified using an available key. The blocks may also include proof components, such as proof components 605a-605d. As an example, the nonce can comprise the proof components 605.

Figure 7:
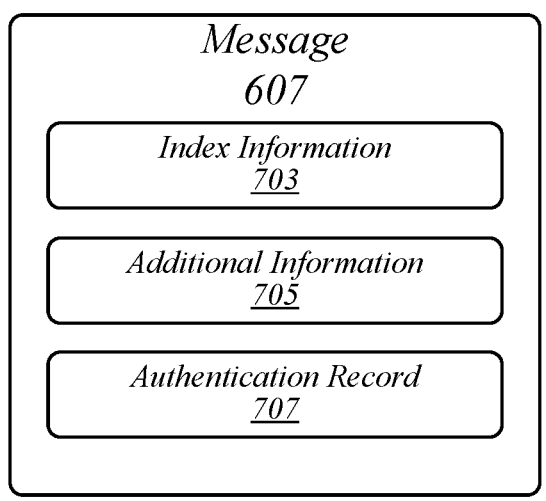
FIG. 7 illustrates a logical model of a message stored in the blockchain of FIG. 6.

FIG. 7 depicts a logical model of a message 607 stored in a blockchain (e.g., an element of blockchain depicted in FIG. 6), consistent with disclosed embodiments. In some embodiments, message 607 may comprise index information 703. In certain aspects, index information 703 may comprise information identifying a user. For example, index information 703 may be at least one of a full name, email address, phone number, or other non-sensitive personal information of the user. In various aspects, index information 703 may include one or more references to earlier blocks in the private blockchain. For example, index information 703 may include one or more references to one or more earlier blocks associated with the same user. A reference may include, as a non-limiting example, a hash of a preceding block in the blockchain associated with the same user. In some aspects, index information 703 may be obfuscated or encrypted according to methods known to one of skill in the art. For example, index information 703 may be encrypted with a cryptographic key. As an additional example, index information 703 may comprise a hash of the at least one of a full name, email address, phone number, or other non-sensitive personal information of the user.

Message 607 may comprise additional information 705, consistent with disclosed embodiments. The additional information 705 can be, for example, metadata or other information related to a transaction conducted between nodes in mesh network 110 (e.g., may provide public keys for certain nodes operating in mesh network 110). In various aspects, additional information 705 may be obfuscated or encrypted according to methods known to one of skill in the art. Message 607 may comprise authentication record 907, consistent with disclosed embodiments. In some aspects, authentication record 707 may comprise information enabling subsequent auditing of transactions. For example, authentication record 707 may identify at least one node of mesh network 110. In some aspects, authentication record 707 may be obfuscated or encrypted according to methods known to one of skill in the art. For example, authentication record 707 may be encrypted with a cryptographic key.

Cryptographic keys may be used to encrypt elements of messages in blocks, consistent with disclosed embodiments. In some aspects, such cryptographic keys may be associated with nodes of mesh network 110. In various aspects, at least some of the cryptographic keys may be associated with authorized nodes. Corresponding cryptographic keys may be available to decrypt the encrypted message elements, consistent with disclosed embodiments. For example, when an element of a message in a block is encrypted with a symmetric key, the same symmetric key may be available for decrypting the encrypted element. As another example, when an element of a message in a block is encrypted with a private key, a corresponding public key may be available for decrypting the encrypted element, or when an element of a message in a block is encrypted with a public key, a corresponding private key may be available for decrypting the encrypted element.

Figure 8:
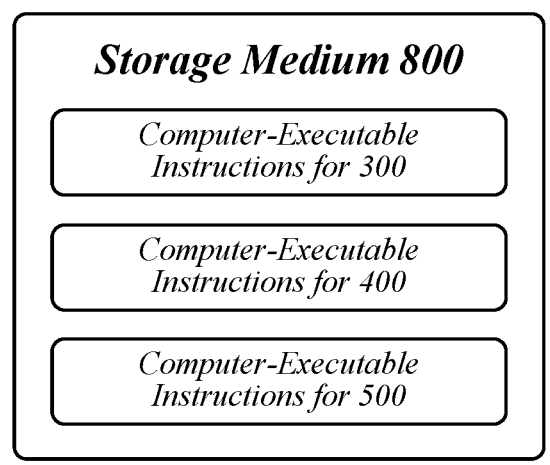
FIG. 8 illustrates a storage medium.

FIG. 8 illustrates a storage medium 800. Storage medium 800 may represent an implementation of a storage device of any electronic device and/or computing device that may operate as a node within network 110 and/or network 210. The storage medium 800 can comprise any non-transitory computer-readable storage medium or machine-readable storage medium. In various embodiments, the storage medium 800 can comprise a physical article of manufacture. In various embodiments, storage medium 800 can store computer-executable instructions, such as computer-executable instructions to implement one or more of logic flows or operations described herein, such as logic flow 300, logic flow 400, and/or logic flow 500. In various embodiments, storage medium 800 can store computer-executable instructions, such as computer-executable instructions to implement any of the functionality described herein in relation to any described device, system, or apparatus. Examples of a computer-readable storage medium or machine-readable storage medium can include any tangible media capable of storing electronic data. Examples of computer-executable instructions can include any type of computer readable code.

Figure 9:
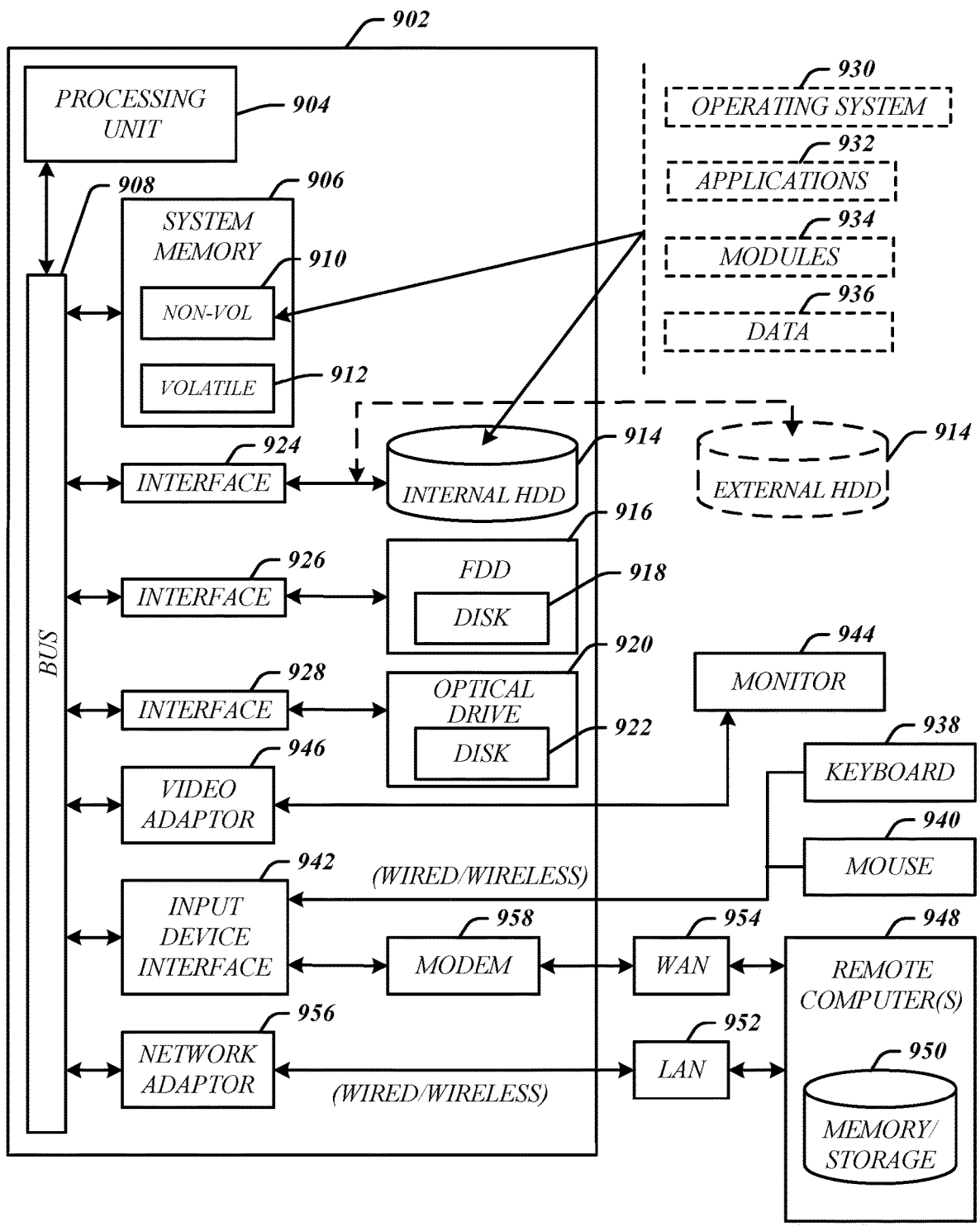
FIG. 9 illustrates a computing architecture.

FIG. 9 illustrates a computing architecture 900 that can implement various embodiments described herein. In various embodiments, the computing architecture 900 can comprise or be implemented as part of an electronic device and/or a computing device. In various embodiments, the computing architecture 900 can represent an implementation of any constituent component of mesh network 110 and/or network 210. One or more of the constituent components of the computing architecture 900, and/or any constituent component of mesh network 110 and/or network 210, can be implemented in hardware, software, or any combination thereof including implementation based on a storage device (e.g., a memory unit) and logic, at least a portion of which is implemented in circuitry and coupled to the storage device. The logic can be or can include a processor or controller component.

The computing architecture 900 can include various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth.

As shown in FIG. 9, the computing architecture 900 can comprise a computer 902 having a processing unit 904, a system memory 906 and a system bus 908. The processing unit 904 can be any of various commercially available processors or can be a specially designed processor.

The system bus 908 provides an interface for system components including, but not limited to, an interface between the system memory 906 and the processing unit 904. The system bus 908 can be any of several types of bus structure that may further interconnect to a memory bus (with or without a memory controller), a peripheral bus, and a local bus using any of a variety of commercially available bus architectures. The system memory 906 can include any type of computer-readable storage media including any type of volatile and non-volatile memory. The computer 902 can include any type of computer-readable storage media including an internal (or external) hard disk drive (HDD) 914. In various embodiments, the computer 902 can include any other type of disk drive such as, for example, a magnetic floppy disk and/or an optical disk drive. The HDD 914 can be connected to the system bus 908 by a HDD interface 924. In various embodiments, any number of program modules can be stored in the drives and memory units 906 and/or 914 such as, for example, an operating system 930, one or more application programs 932, other program modules 934, and program data 936.

A user can enter commands and information into the computer 902 through one or more wired/wireless input devices such as, for example, a keyboard 938 and a pointing device, such as a mouse 940. These and other input devices can be connected to the processing unit 904 through an input device interface 942 that is coupled to the system bus 908. A monitor 944 or other type of display device can also be connected to the system bus 908 via an interface, such as a video adaptor 946. The monitor 944 may be internal or external to the computer 902.

The computer 902 may operate in a networked environment using logical connections via wired and/or wireless communications to one or more remote computers, such as a remote computer 948. The remote computer 948 can be a workstation, a server computer, a router, a personal computer, portable computer, microprocessor-based entertainment appliance, a smartphone, a tablet, a peer device or other common network node, and typically includes many or all of the elements described relative to the computer 902. The logical connections depicted include wired and/or wireless connectivity to networks 952 such as, for example, a local area network (LAN) and/or larger networks, for example, a wide area network (WAN). Networks 952 can provide connectivity to a global communications network such as, for example, the Internet. A network adapter 956 can facilitate wired and/or wireless communications to the networks 952. The computer 902 is operable to communicate over any known wired or wireless communication technology, standard, or protocol according to any known computer networking technology, standard, or protocol.

The following include non-limiting example embodiments:

Example 1 includes a network node, comprising a storage device; and logic, at least a portion of the logic implemented in circuitry coupled to the storage device, the logic to: provide a routing query to transmit information over a network, the routing query comprising at least one destination node for the information and a transmission value, the transmission value comprising an offer amount that the network node offers to pay to route the information to the at least one destination, receive at least one bid from at least one bidding node in response to the routing query, determine a path through the network to transmit the information at least partially anonymously based on the at least one bid that corresponds to the transmission value, and transmit the information at least partially anonymously via the path within a network packet encrypted in a number of layers of encryption corresponding to a number of intermediary nodes in the path, each intermediary node of the path allowing for at least one layer of encryption for the network packet for a cost.

Example 2 includes network node of Example 1, the at least one bid comprising a bid amount that the at least one bidding node requires to transmit the information through the at least one bidding node.

Example 3 includes network node of Example 1, the logic to receive a plurality of bids, and determine the path to include a largest number of bidding nodes in which the value of the plurality of bids is equal to or less than the transmission value.

Example 4 includes network node of Example 1, the logic to broadcast the routing query to a subset of a plurality of nodes of the network selected based on at least one factor.

Example 5 includes network node of Example 1, the path comprising a plurality of intermediary nodes, each intermediary node operative to determine decryption information via decrypting one of the number of layers of encryption, the decryption information indicating a next intermediary node in the path.

Example 6 includes network node of Example 1, the path comprising a plurality of intermediary nodes, each of the plurality of intermediary nodes to receive payment responsive to decrypting one of the layers of encryption and transmitting the information to a next intermediary node in the path.

Example 7 includes network node of Example 1, the logic to transmit a payment to a first intermediary node in the path, the payment comprising an entirety of the cost to transmit the information to the at least one destination node via the path.

Example 8 includes network node of Example 7, the logic to transmit the payment to cause the first intermediary node to receive a first portion of the payment corresponding to a bid associated with the first bidding node, the first intermediary node to transmit a remainder of the payment to a second intermediary node in the path.

Example 9 includes network node of Example 7, the logic to encrypt the payment in the network packet for receipt by a cryptocurrency wallet of an intermediary node.

Example 10 includes computer-implemented method, comprising, via a processor of a network node providing a routing query to a plurality of bidding nodes on a network, the routing query comprising at least one destination node for the information and a transmission value, the transmission value comprising an offer amount that the network node offers to pay to route the information to the at least one destination, and operative to solicit bids to transmit the information from the network node to the at least one destination node over the network; receiving a plurality of bids from the plurality of bidding nodes; accepting the at least one bid that corresponds to the transmission value; determining a path to the at least one destination node via the plurality of bidding nodes associated with the at least one bid; encrypting the information in a network packet in a number of layers of encryption corresponding to a number of intermediary nodes in the path; and causing the transmission of the network packet through the path, each intermediary node of the path allowing for at least one layer of encryption for the network packet for a cost.

Example 11 includes computer-implemented method of Example 10, the at least one bid comprising a bid amount that the at least one intermediary node requires to transmit the information through the at least one intermediary node.

Example 12 includes computer-implemented method of Example 10, comprising determining the path to include a largest number of the plurality of intermediary nodes in which the value of the plurality of bids is equal to or less than the transmission value.

Example 13 includes computer-implemented method of Example 10, comprising broadcasting the routing query to a subset of a plurality of nodes of the network selected based on at least one factor.

Example 14 includes computer-implemented method of Example 10, each intermediary node of the path operative to determine decryption information via decrypting one of the number of layers of encryption, the decryption information indicating a next intermediary node in the path.

Example 15 includes computer-implemented method of Example 10, each intermediary node of the path to receive payment responsive to decrypting one of the layers of encryption and transmitting the information to a next intermediary node in the path.

Example 16 includes computer-implemented method of Example 10, comprising transmitting a payment to a first intermediary node in the path, the payment comprising an entirety of the cost to transmit the information to the at least one intermediary node via the path.

Example 17 includes computer-implemented method of Example 16, comprising transmitting the payment to cause the first intermediary node to receive a first portion of the payment corresponding to a bid associated with the first intermediary node, the first intermediary node to transmit a remainder of the payment to a second intermediary node in the path.

Example 18 includes computer-implemented method of Example 16, comprising encrypting the payment in the network packet for receipt by a cryptocurrency wallet of an intermediary node.

Example 19 includes at least one non-transitory computer-readable medium comprising a set of instructions that, in response to being executed on a network node, cause the network node to provide a routing query to transmit information over a network, the routing query comprising at least one destination node for the information and a transmission value, the transmission value comprising an offer amount that the network node offers to pay to route the information to the at least one destination; receive at least one bid from at least one bidding node in response to the routing query; determine a path through the network to transmit the information at least partially anonymously based on the at least one bid that corresponds to the transmission value; and transmit the information at least partially anonymously through the network via a network packet encrypted in a number of layers of encryption corresponding to a number of intermediary nodes in the path, each intermediary node of the path allowing for at least one layer of encryption for the network packet for a cost.

Example 20 includes the at least one non-transitory computer-readable medium of Example 19, the set of instructions, in response to being executed on the network node, cause the network node to receive a plurality of bids; and determine the path to include a largest number of intermediary nodes in which the value of the plurality of bids is equal to or less than the transmission value.

Various embodiments described herein may comprise one or more elements. An element may comprise any structure arranged to perform certain operations. Each element may be implemented as hardware, software, or any combination thereof. Any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

In various instances, for simplicity, well-known operations, components, and circuits have not been described in detail so as not to obscure the embodiments. It can be appreciated that the specific structural and functional details disclosed herein may be representative and do not necessarily limit the scope of the embodiments.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

The invention claimed is:

1. A peer node of a network, comprising:
   at least one processor; and
   a memory coupled to the at least one processor, the memory comprising instructions that, when executed by the at least one processor, cause the at least one processor to:
   receive a routing query broadcast by an originating peer node to a plurality of peer nodes of the network, the routing query comprising a request by the originating peer node to transmit information over the network to at least one destination peer node and a transmission value indicating an offer amount that the originating peer node offers to pay to route the information to the at least one destination peer node,
   transmit a bid to the originating peer node in response to the routing query, the bid comprising a cost for the peer node to encrypt the information and transmit the information to a next peer node in a transmission path to the destination peer node,
   receive acceptance of the bid from the originating peer node,
   receive the information from one of the plurality of peer nodes in a network packet,
   provide a layer of encryption for the network packet, and
   transmit the network packet to the next peer node in the transmission path.

2. The peer node of the network of claim 1, the instructions, when executed by the at least one processor, to cause the at least one processor to receive payment from one of the originating peer node or an intermediary peer node in the transmission path.

3. The peer node of the network of claim 2, the payment comprising an entirety of a remaining cost to transmit the information to the at least one destination peer node via the transmission path.

4. The peer node of the network of claim 2, the payment comprising the cost indicated in the bid.

5. The peer node of the network of claim 2, the payment encrypted in the network packet for receipt by a cryptocurrency wallet of the peer node.

6. The peer node of the network of claim 1, the cost indicated in the bid determined based on at least one factor, the at least one factor comprising at least one of a decryption processing cost, an encryption cost, a transmission cost, a power consumption cost, data size, or processing time.

7. The peer node of the network of claim 1, the cost indicated in the bid determined based on a threshold cost for transmission plus a markup value.

8. The peer node of the network of claim 1, the bid expiring based on an expiration time.

9. The peer node of the network of claim 1, the transmission path comprising at least one segment between intermediary peer nodes, the at least one segment associated with a segment transmission value indicating a transmission cost to transmit data through the at least one segment.

10. A computer-implemented method, comprising:
    receiving a routing query broadcast by an originating peer node to a plurality of peer nodes of a network, the routing query comprising a request by the originating peer node to transmit information over the network to at least one destination peer node and a transmission value indicating an offer amount that the originating peer node offers to pay to route the information to the at least one destination peer node;
    transmitting a bid to the originating peer node in response to the routing query, the bid comprising a cost for a peer node to encrypt the information and transmit the information to a next peer node in a transmission path to the destination peer node;
    receiving acceptance of the bid from the originating peer node;
    receiving the information from one of the plurality of peer nodes in a network packet;
    providing a layer of encryption for the network packet; and
    transmitting the network packet to the next peer node in the transmission path.

11. The computer-implemented method of claim 10, further comprising receiving payment from one of the originating peer node or an intermediary peer node in the transmission path.

12. The computer-implemented method of claim 11, the payment comprising an entirety of a remaining cost to transmit the information to the at least one destination peer node via the transmission path.

13. The computer-implemented method of claim 11, the payment comprising the cost indicated in the bid.

14. The computer-implemented method of claim 11, the payment encrypted in the network packet for receipt by a cryptocurrency wallet of the at least one destination peer node.

15. The computer-implemented method of claim 10, the cost indicated in the bid determined based on at least one factor, the at least one factor comprising at least one of a decryption processing cost, an encryption cost, a transmission cost, a power consumption cost, data size, or a processing time.

16. The computer-implemented method of claim 10, the cost indicated in the bid determined based on a threshold cost for transmission plus a markup value.

17. The computer-implemented method of claim 10, the bid expiring based on an expiration time.

18. The computer-implemented method of claim 10, the transmission path comprising at least one segment between intermediary peer nodes, the at least one segment associated with a segment transmission value indicating a transmission cost to transmit data through the at least one segment.

19. A non-transitory computer-readable storage medium, the non-transitory computer-readable storage medium including instructions that, when executed by a computing device, cause the computing device to:

receive a routing query broadcast by an originating peer node to a plurality of peer nodes of a network, the routing query comprising a request by the originating peer node to transmit information over the network to a destination peer node and a transmission value indicating an offer amount that the originating peer node offers to pay to route the information to the destination peer node, transmit a bid to the originating peer node in response to the routing query, the bid comprising a cost for the peer node to encrypt the information and transmit the information to a next peer node in a transmission path to the destination peer node, receive acceptance of the bid from the originating peer node, receive the information from one of the plurality of peer nodes in a network packet, provide a layer of encryption for the network packet, and transmit the network packet to the next peer node in the transmission path.

20. The non-transitory computer-readable storage medium of claim 19, the instructions, when executed by the computing device, to cause the computing device to receive payment from one of the originating peer node or an intermediary peer node in the transmission path.

\* \* \* \* \*